Sept. 3, 1968 C. L. KRUMREICH ET AL 3,400,226

HAND TELEPHONE SET

Filed Oct. 27, 1965 2 Sheets-Sheet 1

INVENTORS C. L. KRUMREICH
E. A. MILLS
BY
[signature]
ATTORNEY

United States Patent Office
3,400,226
Patented Sept. 3, 1968

3,400,226
HAND TELEPHONE SET

Charles L. Krumreich and Eugene A. Mills, Indianapolis, Ind., assignors to Bell Telephone Laboratories, Incorporated, New York, N.Y., a corporation of New York
Filed Oct. 27, 1965, Ser. No. 505,376
6 Claims. (Cl. 179—100)

This invention relates to telephone station apparatus and particularly to telephone handsets.

A general object of this invention is to provide a new and novel construction for a handset adapted to have a dial mounted therein.

A more specific object of this invention is to provide an improved construction for such a handset over that disclosed in the copending application of L. N. Wilder, Ser. No. 364,974, filed May 5, 1964, and assigned to the assignee of this invention.

As set forth in the introduction of that application, mounting the dial in the handset affords certain advantages. Dialing is facilitated because the user is not restricted to having to dial at the relatively fixed base of the telephone set. Instead, the user is able to dial from any location to which the handset cord will extend and with the handset and thereby the dial oriented in whatever position is most comfortable.

However, mounting the dial in the handset also introduces certain requirements with regard to the construction of the handset. The handset must be constructed so that it is rigid and strong, yet light in weight. It must be functional, yet have an aesthetically appealing appearance, and it must be separable, yet resistant to tampering and penetration by foreign matter.

The aforementioned application discloses one form of construction that meets these requirements. The handset consists of a top and a bottom shell that mate in a tongue-and-groove arrangement along an arcuate interface. A tight closure between the shells is ensured by molding the tongue of the bottom shell at a slightly greater radius than the groove in the top shell and then securing the shells together by a pair of fasteners that draw the top shell down against the bottom shell.

The fasteners that secure the shells together are spaced along the length of the handset to approximately divide the handset into thirds. One fastener is located under a cover plate adjacent to the earpiece of the handset, and the other fastener is located under the number plate of the dial adjacent to the mouthpiece of the handset.

This arrangement has the disadvantage of requiring that the dial be partially disassembled in order to open the handset for servicing. Thus in order to get at the fastener under the number plate of the dial, it is necessary, where, for example, the dial is of the type disclosed in Patent No. 3,105,122, issued to J. G. Babb and H. J. Hershey on Sept. 24, 1963, to remove the central cover, rotate the clamp spring, remove the finger wheel and the finger wheel and the finger stop, rotate and remove the retaining ring, and remove the number plate and the card. Not only is the removal of these parts time consuming, but with the parts removed it is very easy for the service man to inadvertently dislodge the wheel stop, and such dislodgment results in the spring tension on the motor spring and thereby the timing of the pulsing mechanism being disturbed.

An object of this invention is to provide a dial in handset construction that meets the previously mentioned requirements and permits the handset to be opened for servicing without necessitating that the dial be disassembled.

This and other objects of this invention are achieved in an illustrative embodiment thereof wherein the handset comprises a front shell having an upturned rim including a mating edge and a back shell having a downturned rim including a mating edge, the mating edges being adapted to join with one another to form a closure between the shells. The shells are only fastened together adjacent to one end thereof, a pair of fasteners extending through holes in the front shell and threading into the back shell. The other end of the shells each have catches, and the catches couple with one another to secure the shells together at that end. Intermediate the fastened end and the secured end of the shells, the back shell is provided with fulcrum means that protrude in the same direction as the rim of the shell and presses against the front shell when the two shells are fastened together. The fulcrum means maintain the catches in close engagement with one another and thereby assist the fasteners in providing a tight closure between the shells.

Thus a feature of this invention resides in a handset that is separable into two shells, the shells when joined together being fastened at only one end thereof.

A complete understanding of the invention and of these and other features and advantages thereof may be gained from consideration of the following detailed description which in conjunction with the accompanying drawing discloses one embodiment of the invention. It is to be expressly understood, however, that the drawing and description are not to be construed as defining the limits of the invention.

Figure 1:
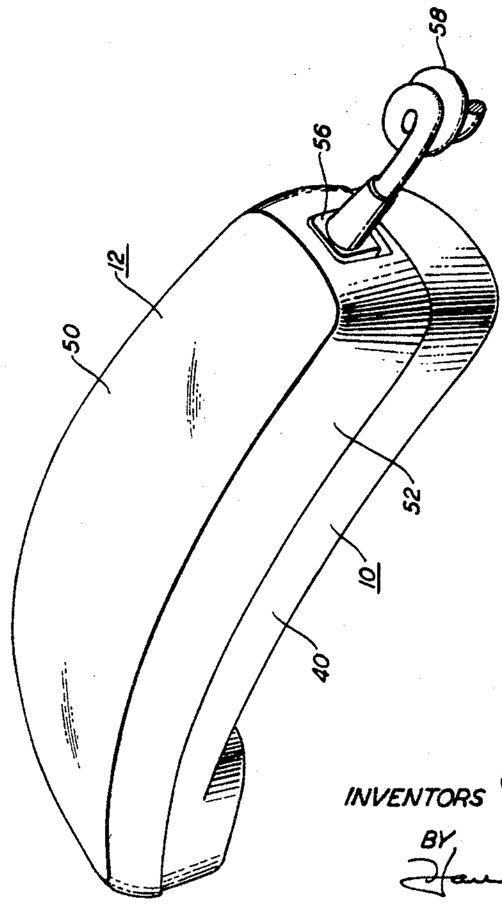
FIG. 1 is a perspective view of the handset.
Figure 2:
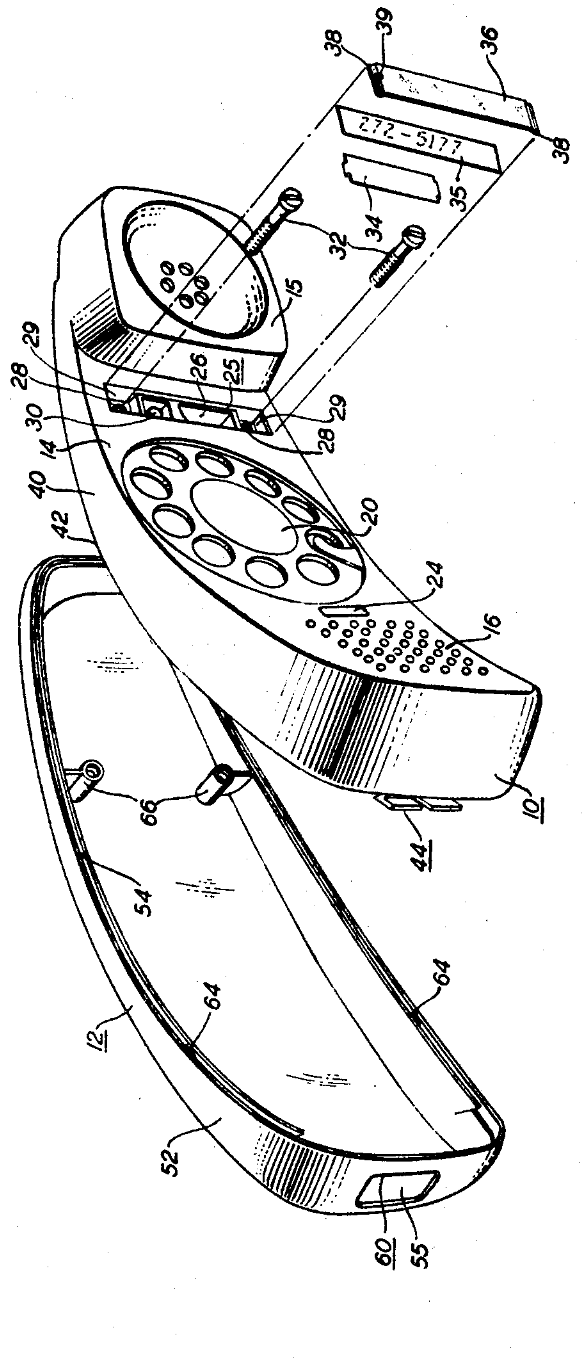
FIG. 2 is an exploded perspective view of the handset showing the two shells that comprise the handset.

Referring to the drawing and FIGS. 1 and 2 in particular, the hand telephone set comprises an arcuate front shell 10 separably joined to an arcuate back shell 12. The front shell 10 includes an oblong concave face 14, one end of which is shaped to provide an earpiece 15 and the other end of which is shaped to provide a mouthpiece 16. In between the earpiece 15 and the mouthpiece 16, the face 14 has a generally circular opening that is adapted to accommodate a dial 20 of the type disclosed in the aforementioned Patent No. 3,105,122. The dial 20 is mounted within the circular opening so that the finger wheel of the dial is essentially flush with the surrounding surface of the face 14.

The face 14 also includes a rectangular opening intermediate the circular opening and the mouthpiece 16, and a pushbutton 24 positioned within the rectangular opening operates a hookswitch housed within the hand telephone set. The pushbutton 24 in its normal or undepressed position has the upper surface thereof essentially flush with the surrounding surface of the face 14.

Finally, the face 14 has a rectangular cavity 25 intermediate the earpiece 15 and the circular opening. The cavity 25 includes an apertured center portion 26 and a recessed surface 28 on each side of the center portion, and each end of the cavity is undercut to provide a lip 29. The center portion 26 accommodates a lamp 30 for illuminating the dial 20, while each recessed surface 28 has a hole extending therethrough in which a screw 32 is positioned. Both the lamp 30 and the heads of screws 32 are accessible from the face 14 when the cavity 25 is exposed, but the cavity is normally covered by a number assembly that comprises a masking plate 34, a station number card 35, and a transparent cover plate 36.

The masking plate 34 fits over the center portion 26 and prevents light from the lamp 30 from passing through the number card 35 and cover plate 36. The number card 35 bears the telephone number of the station with which the hand telephone set is associated and it extends along the entire length and width of the cavity 25 and beneath the lips 29. The number card 35 thereby covers both the masking plate 34 and the heads of the screws 32.

The transparent cover plate 36 also fills the entire length and width of the cavity 25, and it is provided with flange portions 38 at the ends thereof that fit beneath the lips 29 of the cavity and secure it and thereby the masking plate 34 and the number card 35 in place. Furthermore, the cover plate 36 is of a depth so that when it is positioned with the flange portions 38 thereof beneath the lips 29, the upper surface of the cover plate is essentially flush with the surrounding surface of the face 14. Finally, the cover plate 36 is formed from a clear flexible material which has a hole 39 extending therethrough adjacent one end thereof that is of a size to accommodate a wire such as a paper clip, whereby that end may be deflected toward the other end to bow the cover plate and permit the removal thereof when access to the various elements of the number card assembly or the cavity 25 is desired.

Figure 3:
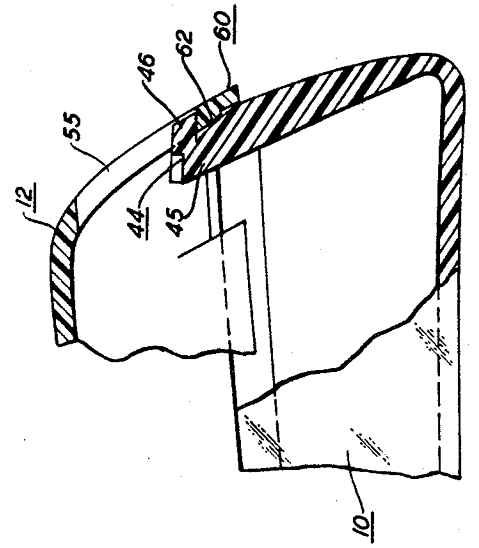
FIG. 3 is a sectional view showing the manner in which the two shells are secured together at one end.

A rim 40 extends from the periphery of the face 14 in a direction generally normal to the face. The edge of the rim 40 remote to the face 14 generally conforms to the curvature of the face and includes a tongue portion 42 that extends along substantially the entire length of the rim and a catch portion 44 that projects beyond the tongue portion from the portion of the rim extending from the mouthpiece end of the face. As shown most clearly in FIG. 3, the catch portion 44 comprises a generally L-shaped element having one leg 45 that extends generally parallel to the rim 40 and a second leg 46 that extends generally normal to the rim. The catch portion 44 is located so as to be substantially equidistant from each of the holes in the recessed surfaces 28.

The back shell 12 comprises an oblong convex face 50 that is juxtaposed with the face 14 of the front shell 10 when the two shells are joined. A rim 52 extends from the periphery of the face 50, the rim extending generally normal to the face. The edge of the rim 52 remote to the face 50 generally conforms to the curvature of the face and includes a groove portion 54 that is adapted to accommodate the tongue portion 42 of the front shell 10.

The rim 52 also includes an opening 55 in the portion thereof extending from the end of the face 50 adapted to be placed in juxtaposition with the mouthpiece end of the face 14 of the front shell 10. The opening 55 accommodates a plug 56 mounted on the end of a cord 58, the plug making electrical connection with a socket (not shown) within the hand telephone set. The lower edge of the opening 55, as viewed in FIG. 3, includes a catch portion 60, the catch portion comprising a ledge 62 that extends generally normal to the rim 52 and is adapted to fit beneath the leg 46 of the catch portion 44 of the front shell 10.

In addition, a pair of spaced bosses 64 are located within the groove portion 54 of the rim 52. The bosses 64 are located on opposite sides of the rim 52 in the vicinity of and equidistant from the catch portion 60. The bosses 64 are of a height to engage the tongue portion 42 of the front shell 10 and provide a fulcrum point about which the back shell 12 is flexed when it is secured to the front shell.

Finally, a pair of spaced tapped bushings 66 extend from the face 50 in the same direction as the rim 52. The spaced bosses, which are substantially equidistant from the catch portion 60, are located in registration with the holes in the recessed surface 28 when the front shell 10 and back shell 12 are joined.

The front shell 10 and back shell 12 are assembled together by placing the ledge 62 of the catch portion 60 underneath the leg 46 of the catch portion 44 and at the same time positoning the tongue portion 42 of the rim 40 in alignment with the groove portion 54 of the rim 52. The screws 32 are then threaded into the bushings 66, and as the heads of the screws bear down on the recessed surfaces 28 of the cavity 25, the front and back shells 10 and 12 are drawn toward one another, pressing the tongue portion 42 into the groove portion 54.

The bosses 64 in the groove portion 54 are thereby pressed against the facing areas of the tongue portion 42. As the bosses 64 are of a height to provide fulcrum points and as the point of contact of the bosses with the tongue portion 42 is intermediate the points of engagement of the screws 32 with the bushings 66 and the catch portion 44 with the catch portion 60, the front and back shells 10 and 12 are flexed about the bosses. The ledge 62 of the catch portion 60 is thereby forced into tight engagement with the leg 46 of the catch portion 44, and this in combination with the tongue-and-groove mating of the front and back shells 10 and 12 provides a tight closure along the entire length of the hand telephone set.

What is claimed is:

1. A handset comprising:

a first housing member having an upturned rim including a mating edge, the first housing member further having a catch at one end thereof, a portion of the catch extending from the housing member in a direction generally normal to the rim;

a second housing member having a downturned rim including a mating edge adapted to join with the mating edge of the first housing member to form a closure between the housing members, the second housing member further having a catch at one end thereof, the catch being adapted to engage the catch of the first housing member to secure the two housing members together at the one end thereof;

means for fastening the first and second housing members together in the vicinity of the other end thereof; and fulcrum means protruding from one of the housing members in the same general direction as the rim thereof, the fulcrum means being located intermediate the securing portion of the housing and the housing and the fastening portion of the housing, the fulcrum means engaging the other housing member when the two housing members are fastened together and acting to deflect the secured ends of the housing members into tight engagement.

2. A handset comprising:

a first arcuate shell having an upturned rim including a tongue at the upper extremity thereof and a catch at one end thereof, a portion of the catch extending in a direction generally normal to the general direction of the rim;

a second arcuate shell complementary to the first shell, the second shell having a downturned rim including a groove at the lower extremity thereof and a catch at one end thereof, a portion of the catch extending in a direction generally normal to the general direction of the rim, the groove of the second shell being adapted to accommodate the tongue of the first shell to form a closure between the shells, and the catch of the second shell being adapted to couple with the catch of the first shell to latch the shells together at one end;

means for fastening the shells together at a point adjacent to the end opposite to the catches; and fulcrum means protruding from one of the shells in the same general direction as the rim thereof, the fulcrum means being located adjacent to the end of the shell having the catch, the fulcrum means engaging the other shell when the two shells are fastened together and acting to deflect latched ends of the shells into tight engagement with one another.

3. A handset as in claim 2 wherein the catch of the first shell comprises an inverted L-shaped element extending upwardly beyond the tongue, one leg extending generally parallel to the rim and the other leg extending generally normal to the rim, and the catch of the second shell comprises a ledge on an opening for receiving a handset cord, the ledge being adapted to fit beneath one of the legs of the L-shaped element.

4. A handset as in claim 2 wherein the fulcrum means comprises a pair of spaced bosses located within the groove of the second shell substantially equidistant from the end of the shell having the catch.

5. A handset as in claim 2 wherein the fastening means comprises a pair of spaced upstanding tapped bushings mounted in the second shell substantially equidistant from the end of the shell having the catch, and a pair of spaced screws that extend through the first shell and are adapted to thread into the bushings, the heads of the screws being concealable within a cavity in the underside of the first shell.

6. A dial in handset comprising:

a first arcuate shell having an oblong face one end of which is shaped to provide a mouthpiece, the other end of which is shaped to provide an earpiece, and the center of which is adapted to accommodate a dial, the face having a cavity intermediate the dial accommodating area and the earpiece, the cavity having a pair of spaced holes therein that are substantially equidistant from the mouthpiece end of the face, a rim extending from the periphery of the face in a direction generally normal to the face, the edge of the rim remote to the face including a tongue portion and a catch portion, the catch portion extending beyond the tongue portion from the end of the face having the mouthpiece, the catch portion comprising an L-shaped element one leg of which extends generally normal to the face and the other of which extends generally parallel to the face;

a second arcuate shell adapted to be joined with the first shell to form an enclosure, the second shell having an oblong face, the face being juxtaposed with the face of the first shell when the two shells are joined, a rim extending from the periphery of the face in a direction generally normal to the face, the edge of the rim remote to the face including a groove portion adapted to accommodate the tongue portion of the first shell when the two shells are joined, the rim also including an opening in the portion thereof extending from the end of the face adapted to be juxtaposed with the mouthpiece end of the first shell, the rim further including a catch portion comprising a ledge on one edge of the opening, the catch portion being adapted to couple with the catch portion on the first shell to latch the shells together at one end, a pair of spaced bosses located within the groove portion of the rim, the bosses being in the vicinity of and substantially equidistant from the catch portion of the rim, the bosses engaging the tongue portion of the first shell when the shells are joined, a pair of spaced tapped bushings extending from the face of the shell in the same direction as the rim, the spaced bosses being in juxtaposition with the pair of spaced holes in the cavity in the face of the first shell when the shells are joined;

a pair of screws adapted to be inserted through the holes in the cavity in the face of the first shell and threaded into the tapped bushings of the second shell to secure the two shells together; and a number assembly adapted to fit within the cavity in the face of the first shell to conceal the screw and to display the number of the telephone station with which the handset is associated.

No references cited.

KATHLEEN H. CLAFFY, *Primary Examiner.*

A. A. McGILL, *Assistant Examiner.*